United States Patent
Neves et al.

(10) Patent No.: US 9,955,436 B2
(45) Date of Patent: *Apr. 24, 2018

(54) SYSTEMS AND METHODS FOR IMPROVING FIXED ACCESS POINT COVERAGE USING VEHICLE ROUTE INFORMATION IN A NETWORK OF MOVING THINGS

(71) Applicant: Veniam, Inc., Mountain View, CA (US)

(72) Inventors: Filipe Manuel Almeida Neves, Águeda (PT); Diogo Emanuel da Silva Jordão Carreira, Pombal (PT); André Amorim de Faria Cardote, Aveiro (PT)

(73) Assignee: Veniam, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/728,973

(22) Filed: Oct. 10, 2017

(65) Prior Publication Data

US 2018/0035391 A1     Feb. 1, 2018

Related U.S. Application Data

(63) Continuation of application No. 15/351,861, filed on Nov. 15, 2016, now Pat. No. 9,788,282.

(60) Provisional application No. 62/260,749, filed on Nov. 30, 2015.

(51) Int. Cl.
| | | |
|---|---|---|
| H04B 7/00 | (2006.01) | |
| H04W 52/28 | (2009.01) | |
| H04W 16/00 | (2009.01) | |
| H04W 4/04 | (2009.01) | |
| H04B 7/02 | (2018.01) | |
| H04W 52/24 | (2009.01) | |
| H04W 84/00 | (2009.01) | |
| H04W 72/04 | (2009.01) | |

(Continued)

(52) U.S. Cl.
CPC ........... *H04W 52/283* (2013.01); *H04B 7/02* (2013.01); *H04W 4/046* (2013.01); *H04W 16/00* (2013.01); *H04W 52/246* (2013.01); *H04W 72/046* (2013.01); *H04W 72/0473* (2013.01); *H04W 84/005* (2013.01); *H04L 67/12* (2013.01); *H04W 12/12* (2013.01)

(58) Field of Classification Search
CPC ... H04W 52/283; H04W 52/246; H04W 7/02; H04W 4/046; H04W 16/00; H04W 72/046; H04W 72/0473; H04W 84/005; H04W 12/12; H04L 67/12
See application file for complete search history.

(56) References Cited

U.S. PATENT DOCUMENTS

| | | |
|---|---|---|
| 7,349,463 B1 | 3/2008 | Pajukoski et al. |
| 9,788,282 B2 | 10/2017 | Neves et al. |
| 2001/0023188 A1 | 9/2001 | Komatsu |

(Continued)

*Primary Examiner* — Dominic Rego
(74) *Attorney, Agent, or Firm* — McAndrews, Held & Malloy, Ltd.

(57) ABSTRACT

Communication network architectures, systems and methods for supporting a network of mobile nodes. As non-limiting examples, various aspects of this disclosure provide systems and methods for adapting fixed access point coverage and/or power input/output in a network of moving things that may include autonomous vehicles.

24 Claims, 13 Drawing Sheets

(51) Int. Cl.
*H04W 12/12* (2009.01)
*H04L 29/08* (2006.01)

(56) References Cited

U.S. PATENT DOCUMENTS

| | | |
|---|---|---|
| 2003/0092380 A1* | 5/2003 | Soliman .................... G01S 3/14 455/12.1 |
| 2006/0234754 A1 | 10/2006 | Takano et al. |
| 2007/0007821 A1 | 1/2007 | Rossetti |
| 2007/0054633 A1 | 3/2007 | Piirainen |
| 2009/0017850 A1 | 1/2009 | Jovicic et al. |
| 2009/0273449 A1 | 11/2009 | Tuttle |
| 2009/0315412 A1 | 12/2009 | Yamamoto et al. |
| 2011/0059706 A1 | 3/2011 | Harel et al. |
| 2011/0070919 A1 | 3/2011 | Komine et al. |
| 2011/0283768 A1 | 11/2011 | Peczalski |
| 2011/0285571 A1 | 11/2011 | Jeong et al. |
| 2012/0099457 A1 | 4/2012 | Roy |
| 2013/0027250 A1 | 1/2013 | Chen |
| 2013/0083774 A1 | 4/2013 | Son et al. |
| 2013/0115989 A1* | 5/2013 | Yamazaki ............. H04W 16/08 455/507 |
| 2013/0241304 A1 | 9/2013 | Bae |
| 2013/0260787 A1* | 10/2013 | Hashimoto ........... H04W 64/00 455/456.1 |
| 2014/0192727 A1 | 7/2014 | Liu et al. |
| 2014/0253363 A1 | 9/2014 | Kajiki |
| 2014/0295751 A1 | 10/2014 | Miyata |
| 2015/0289212 A1 | 10/2015 | Januszewski et al. |
| 2015/0365155 A1 | 12/2015 | Subramanian et al. |
| 2016/0269132 A1 | 9/2016 | Clark et al. |
| 2016/0366714 A1 | 12/2016 | Chen et al. |
| 2017/0033845 A1 | 2/2017 | Sanderovich et al. |

* cited by examiner

SYSTEMS AND METHODS FOR IMPROVING FIXED ACCESS POINT COVERAGE USING VEHICLE ROUTE INFORMATION IN A NETWORK OF MOVING THINGS

CROSS-REFERENCE TO RELATED APPLICATIONS/INCORPORATION BY REFERENCE

This patent application is a continuation of U.S. Non-Provisional patent application Ser. No. 15/351,861, filed Nov. 15, 2016, and titled "Systems and Methods for Improving Fixed Access Point Coverage in a Network of Moving Things, for Example Including a Network of Autonomous Vehicles," now U.S. Pat. No. 9,788,282, which makes reference to, claims priority to, and claims benefit from U.S. Provisional Patent Application Ser. No. 62/260,749, filed on Nov. 30, 2015, and titled "Systems and Methods for Improving Fixed Access Point Coverage in a Network of Moving Things," which is hereby incorporated herein by reference in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
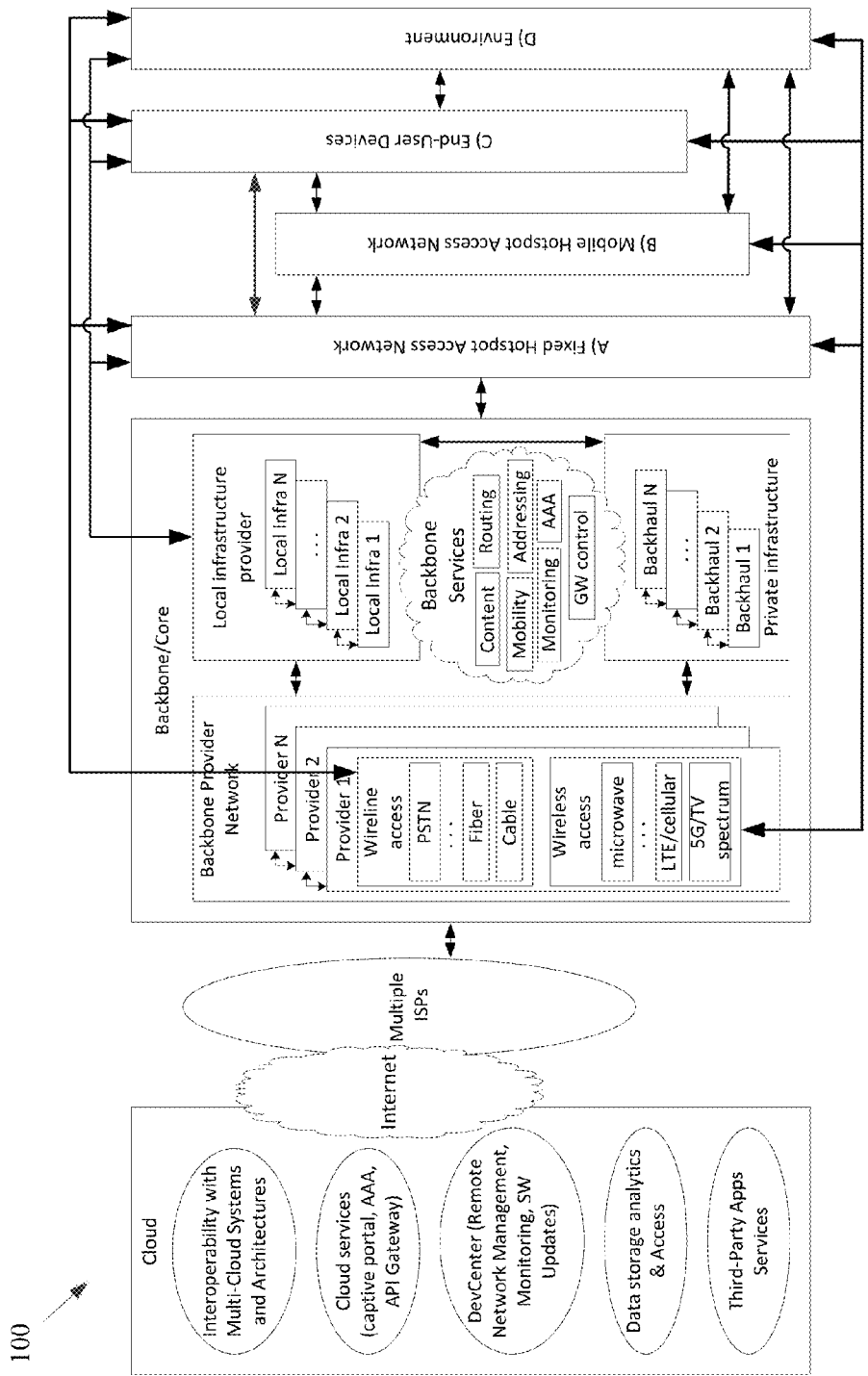
FIG. 1 shows a block diagram of a communication network, in accordance with various aspects of this disclosure.

Various aspects of this disclosure provide systems and methods for enhancing node operation in a network of moving things. As non-limiting examples, various aspects of this disclosure provide systems and methods for adapting fixed access point coverage and/or power input/output in a network of moving things.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set $\{(x), (y), (x, y)\}$. That is, "x and/or y" means "one or both of x and y." As another example, "x, y, and/or z" means any element of the seven-element set $\{(x), (y), (z), (x, y), (x, z), (y, z), (x, y, z)\}$. That is, "x, y, and/or x" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
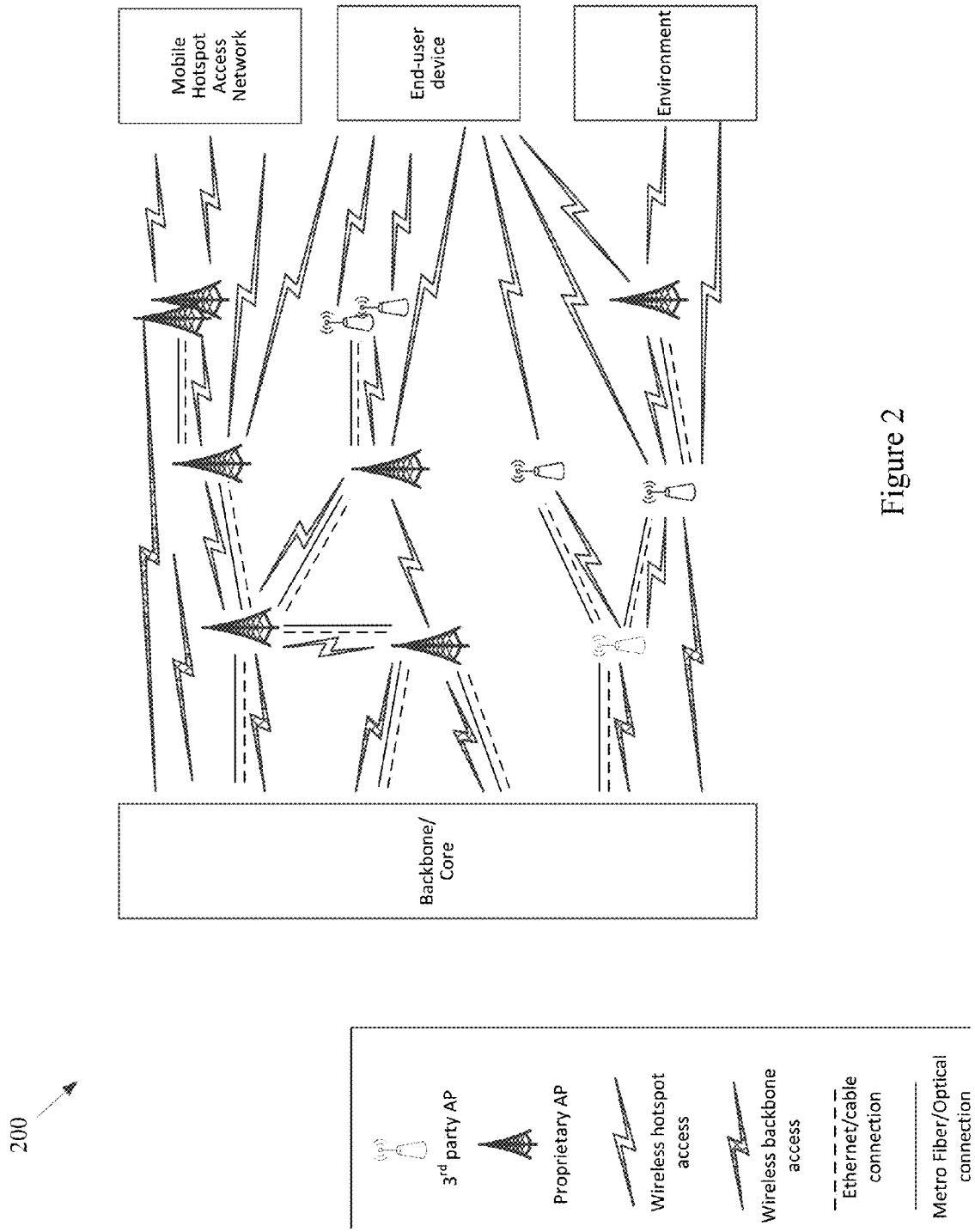
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks and/or network components 100, 300, 400, 500-570, and 600, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
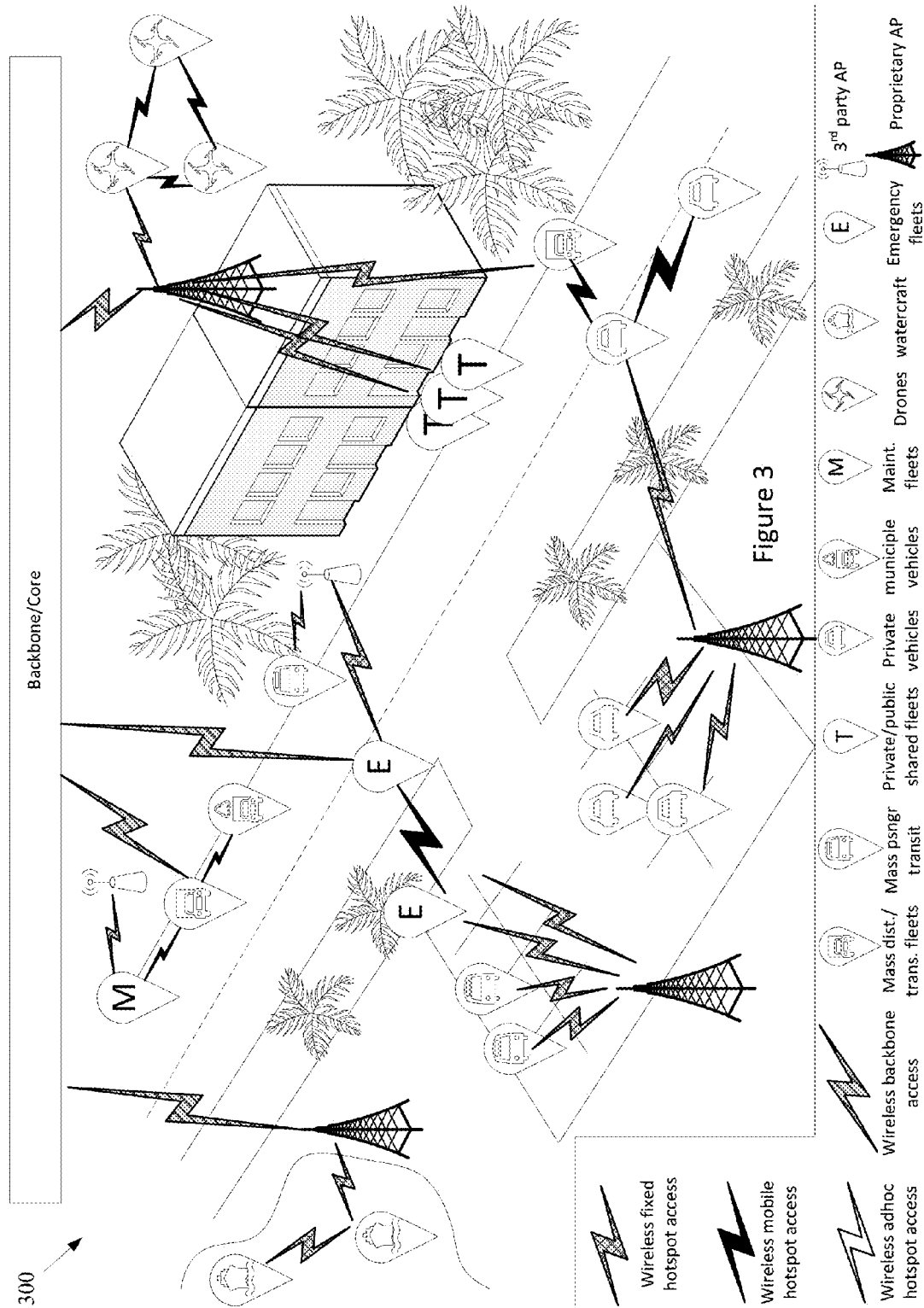
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks and/or network components 100, 200, 400, 500-570, and 600 discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
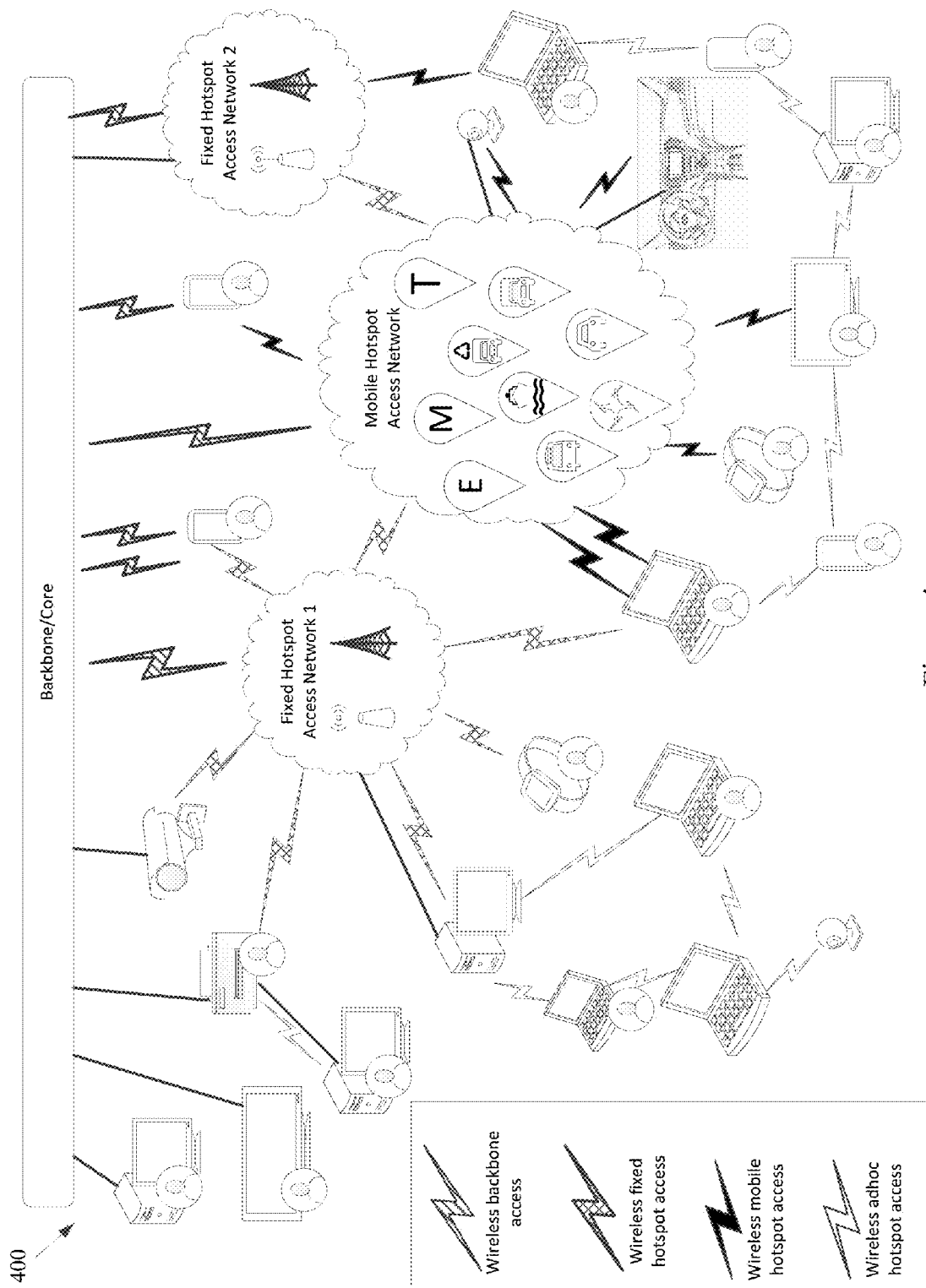
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
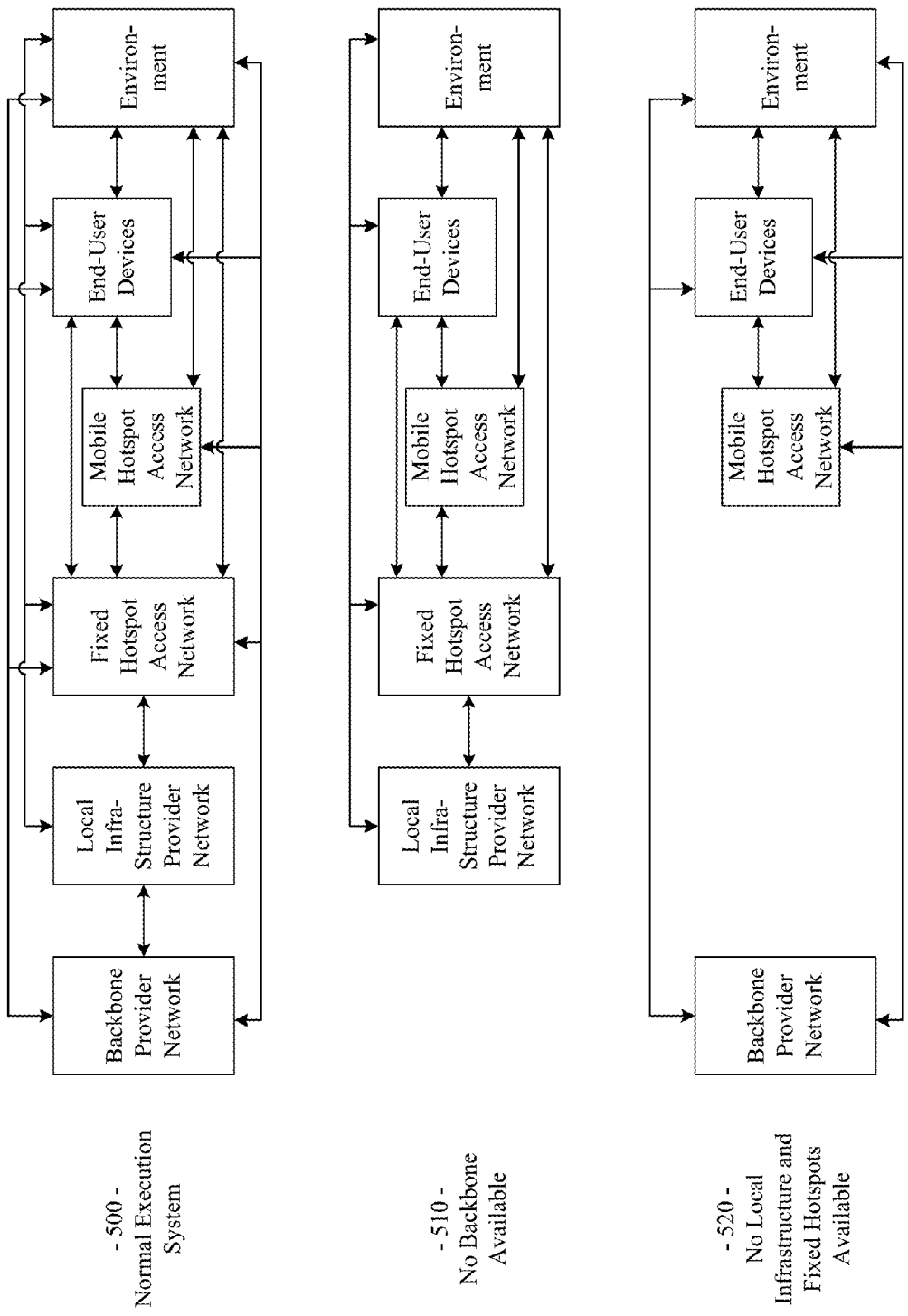
FIGS. 5A-5C show a plurality of network configurations illustrating the flexibility and/or and resiliency of a communication network, in accordance with various aspects of this disclosure.
Figure 5B:
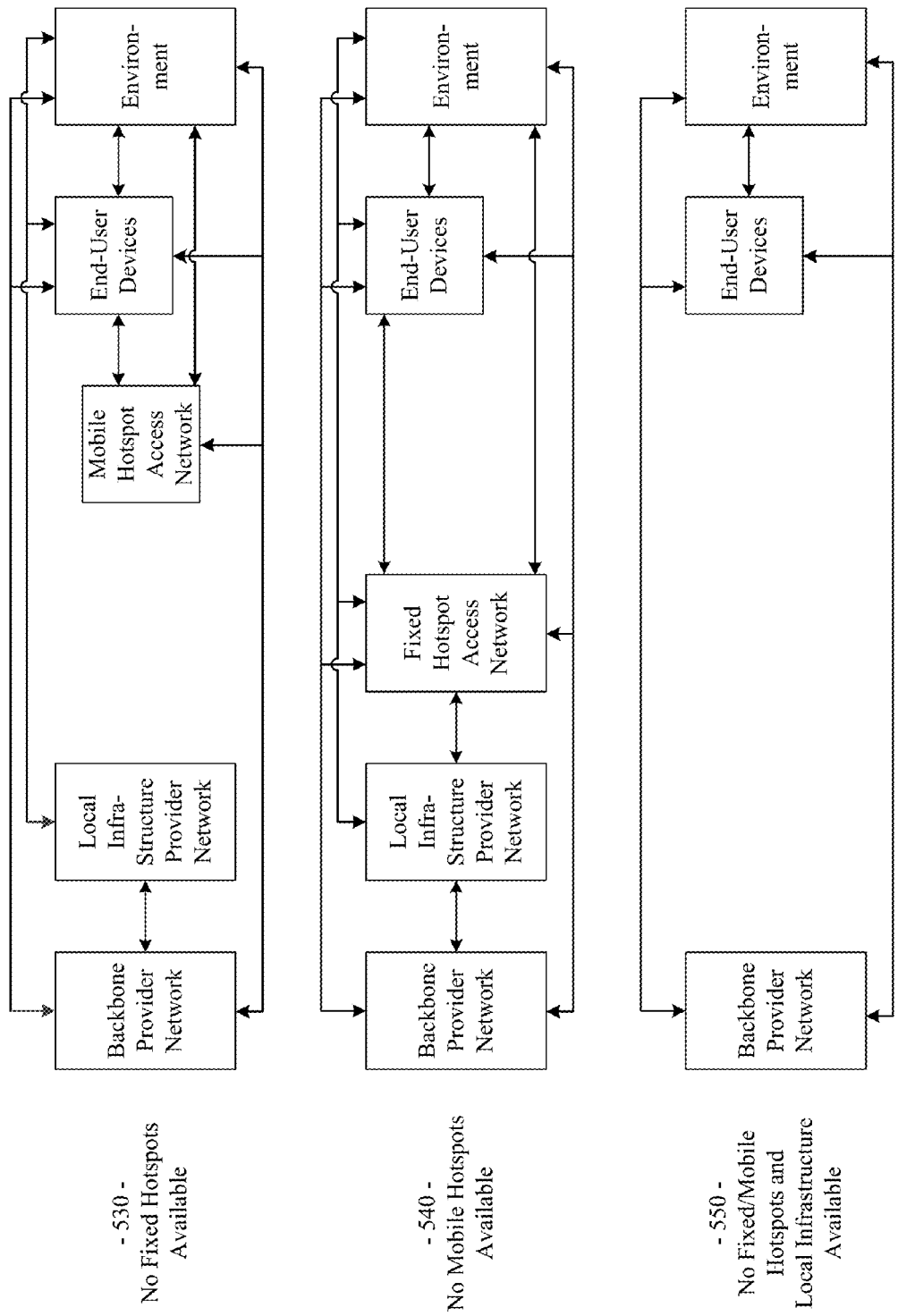
Figure 5C:
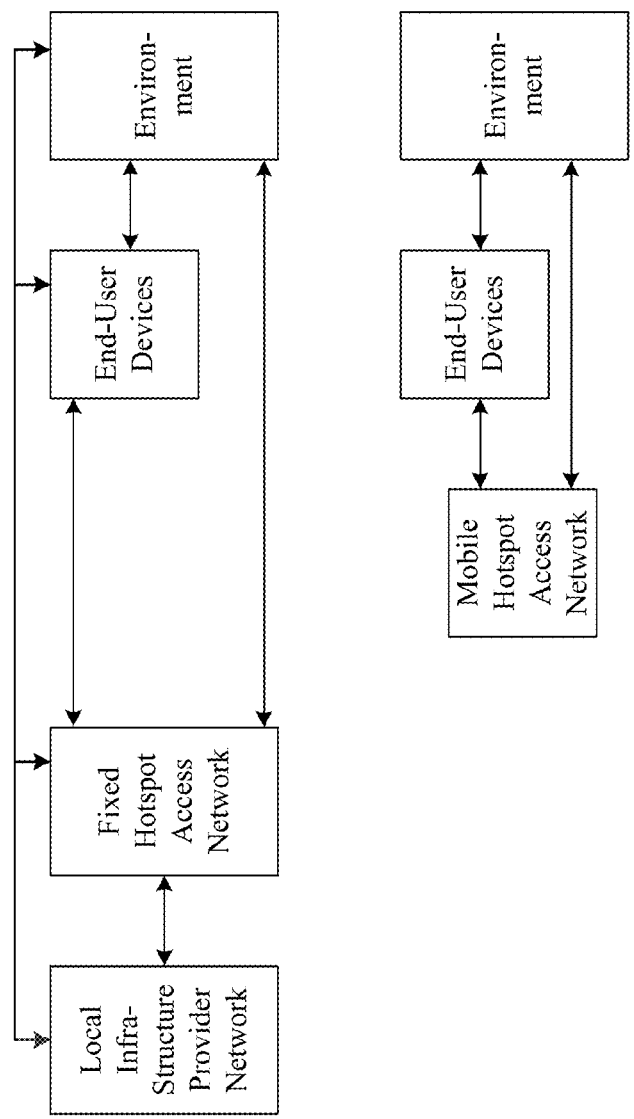

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration)

via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
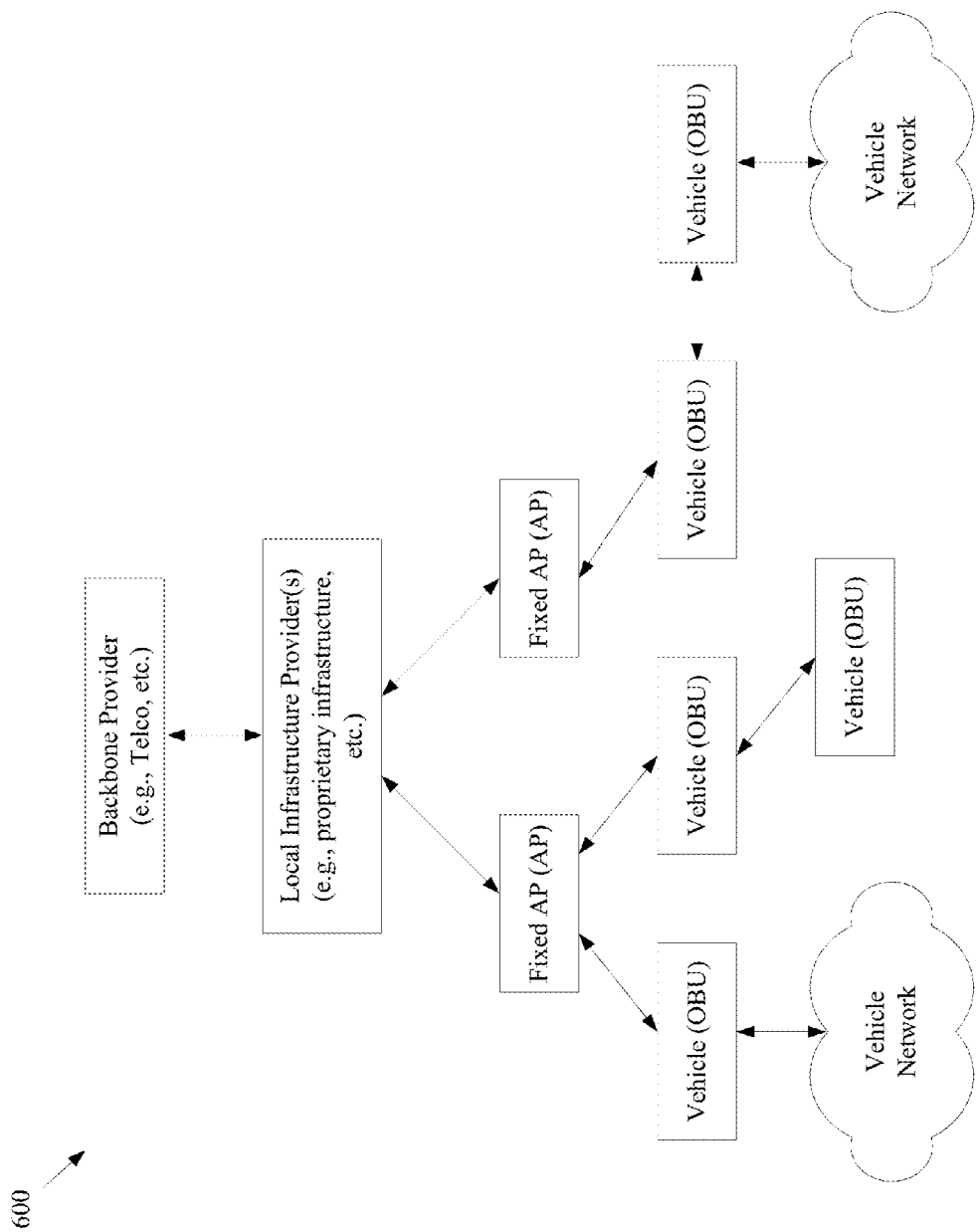
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

As discussed herein, a network of moving things (e.g., including moving access points, moving sensors, moving user client devices, etc.) may be supported by an infrastructure that comprises a mesh among fixed and mobile APs that can flexibly establish connections with the Internet, the Cloud, private networks, etc.

To take fully advantage of this flexible network, various aspects of this disclosure provide for increased connectivity time and/or link quality between the mobile APs and the fixed APs. Such enhancements, for example, improve the Quality of Service (QoS) provided and the Quality of Experience (QoE or QoX or QX) of the user. Such enhancements, for example, increase wireless throughput, reduce packet loss and retransmission, reduce latency, reduce power consumption, etc. In an example implementation in which Wi-Fi (e.g., IEEE 802.11a/b/g/n/ac/af) (or DSRC) links are utilized between fixed APs and between fixed APs and mobile APs, the enhancements provided herein may provide increased QoE relative to Wi-Fi and cellular, and substantially reduced communication cost relative to cellular.

In an example scenario in which there is only one mobile AP in range (or in the coverage area) of the fixed AP, the fixed AP can allocate a substantial amount or all of its resources (e.g., communication bandwidth, etc.) to the mobile AP. For example, the AP may point a directional antenna at the mobile AP, for example tracking the mobile AP. Additionally, other communication parameters (e.g., rate control, coding and/or modulation characteristics, transmission power, etc.) may be adapted specifically for communication with the mobile AP. Similarly, as discussed in more detail herein, such flexible operation may also be utilized in a scenario in which a plurality of mobile APs are in range of the fixed AP (e.g., favoring the highest priority AP, minimizing a cost function, etc.).

Additionally, various aspects of the present disclosure provide the flexibility for a fixed AP (or other node), which was improperly installed or for which an operating environment is substantially different from the anticipated operating environment, to adapt operation to address the improper installation, unexpected operating environment, etc. Such adaptation may, for example, be permanent or semi-permanent, but may also be temporary or just long enough for the installation to be noticed and fixed or otherwise adjusted. For example, in an example scenario in which an antenna for a fixed AP was installed pointing north instead of northwest, the fixed AP may adapt the pointing direction on its own. Such adaptation may, for example, be autonomous (e.g., listening to other nodes, etc.), or may be performed in conjunction with other nodes. As with all adaptations discussed herein, information of the adaptation may be communicated to a central controller or command center to process (e.g., to determine whether the adaptation is expected or unexpected, in which case a technician may be dispatched to analyze or address the unexpected behavior).

Additionally, as discussed further herein, various aspects of the present disclosure provide for backhaul adaptability and/or power supply adaptability, which for example provide for flexible node installation. For example, a fixed access point may be installed at a location that was previously impossible or economically infeasible, for example utilizing the backhaul and/or power supply adaptability provided herein. Any of a variety of power sources discussed herein may be flexibly utilized (e.g., from the power grid, from wireless power transfer (WPT) or wireless energy transmission, solar power, wind power, power over Ethernet, etc.).

As mentioned herein, node antennas may be flexibly adapted by the node, but node position may also be adapted. For example, in a scenario in which the access point housing is fixedly attached to the antenna, the position of the access point housing may also be adapted. As discussed in more detail herein, in an example scenario in which a fixed AP is mounted to a pole or other structure, the fixed AP may be mounted utilizing a fixture that provides for automated movement in one or more degrees of freedom (e.g., a circumferential rail system, one or more rotary joints, etc.).

Various aspects of this disclosure may, for example, provide for improved infrastructure planning, for example with regard to fixed AP placement and/or utilization, by providing increased range of connectivity. In an example implementation, the enhancements disclosed herein may be leveraged to minimize the number of fixed APs utilized to cover the same area. Additionally, the enhancements disclosed herein may be used to configure the system with the number of APs needed to achieve target levels of system reliability and availability. To enhance system flexibility (e.g., to address unexpected system operation, node failures, etc.), a plurality of antennas may be installed with an AP for flexible selection and utilization thereof. For example, one or more antennas might only be used in a fail over scenario, for example in which another network node has failed. In such a manner, a fixed AP may be utilized to cover an area normally covered by another fixed AP that has failed or has been re-tasked, may be utilized as part of the backhaul to address a backhaul failure, etc. For example, a fixed AP may switch in another antenna to cover an area not normally covered by the fixed AP (e.g., an area or portion of an area normally covered by a failed or re-tasked fixed AP). Also for example, a fixed AP may switch in another antenna pointed directly at another node for performing backhaul functionality (e.g., as an original plan, in response to a backhaul failure and/or overload, etc.).

Various aspects of this disclosure may, for example, enhance vehicular connectivity by utilizing smart antennas, independently of the location of the mobile AP inside the vehicle. For example, a fixed AP may continually listen and measure the strength of signals received from the mobile AP, and then automatically adapt its orientation and/or antenna orientation (using position control) to increase the received signal strength, thus enhancing the connectivity.

In an example implementation in which AP and/or antenna orientation may be controlled, the AP may be generally fixed (e.g., operate at a fixed geographical location) but may be at least somewhat moveable. As will be discussed herein, such movement may be horizontal, vertical, etc. For example, the AP and/or antenna orientation may be controlled with one, two, or three degrees of freedom.

Note that antenna gain (e.g., amplifier gain, gain to the antenna pattern, etc.) may be adjusted electrically or positionally to reduce gain. For example, when the antenna is positioned such that it detects too much noise from various sources, the position of the antenna may be adjusted to position such noise sources in dead zones or high-attenuation zones of the antenna. Various electrical adjustments may also be made.

As discussed herein, various aspects of the present disclosure provide for increased reliability and coverage.

Figure 7:
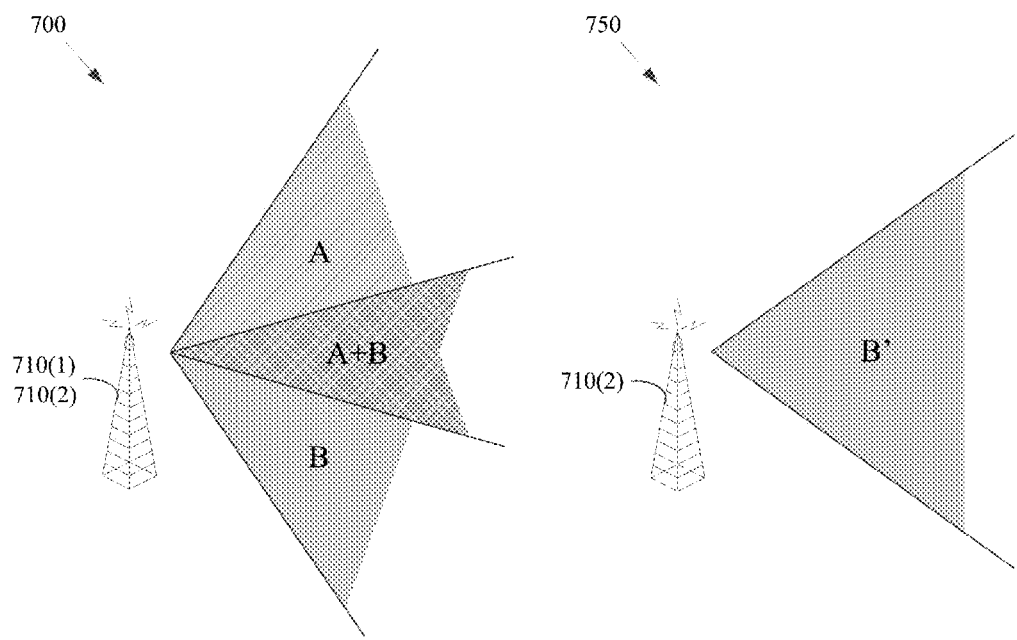
FIG. 7 shows a diagram of a system and method at a network node for adapting antenna coverage, in accordance with various aspects of the present disclosure.

FIG. 7 shows a diagram of a system and method at a network node for adapting antenna coverage, in accordance with various aspects of the present disclosure. The example system 700 may, for example, share any or all characteristics with the other example methods, networks, and/or network components 100-600 and 800-1300, discussed herein. For example, the node(s) 710 may share any or all characteristics with any fixed AP nodes discussed herein.

In the example scenario, as shown at label 700, a first fixed AP 710(1) may be operating with the coverage area A, and a second fixed AP 710(2) may be operating with the coverage area B. The coverage areas are shown overlapping in the region A+B, in which either AP may provide communication services and in which maximum service may be provided (e.g., to a mobile AP, to another fixed AP, to a sensor system, to a client system, etc.). In the overlapping region A+B, a mobile AP may for example be served by the AP that provides the best service to the mobile AP. Note that the first fixed AP 710(1) and the second AP 710(2) may operate on different channels, but need not.

In an example scenario, the determination may be made (e.g., by the second AP autonomously, by the first 710(1) and second AP 710(2) communicating with each other, by a central network controller, etc.) to operate only using only the second AP 710(2). This decision may be made for any of a variety of reasons. For example, the first AP 710(1) may fail (e.g., hardware failure, power failure, backhaul failure, software glitch, etc.). Also for example, the first AP 710(1) may be under maintenance (e.g., being replaced or otherwise being serviced by a technician, being tested by the system, etc.). Additionally for example, it may be detected that the performance of the first AP 710(1) has degraded to a point that it should be taken off-line. Further, for example, the first AP 710(1) may have been re-tasked, for example to address an emergency situation.

At label 750, a scenario is shown in which the second AP 710(2) is operating. Additionally, the second AP 710(2) is shown with an adapted coverage region B'. For example, as discussed herein, the second AP 710(2) may rotate one or more antennas originally providing the coverage area B to one or more respective positions providing coverage area B'. The new coverage area B' may, for example, include a substantial portion of the original coverage areas A and B. Considering degraded coverage at the edges of the new coverage area B', it may even be the case that the second AP 710(2) may provide at least some coverage, albeit at a relatively low quality, at the upper portion of the original coverage area A and at the lower portion of the original coverage area B.

The rotational control of the antennas (or APs) may be performed in any of a variety of manners. For example, an antenna may be mounted on a single-axis, dual-axis, or three-axis rotation system (e.g., with each axis controlled by a respective motor (or other actuator) and control circuitry). Each axis may, for example, be coupled to a sensor (e.g., an encoder, a resolver, a potentiometer, a limit switch, etc.) that provides rotational and/or translational position or orientation (e.g., attitude) feedback to the AP antenna position control circuitry.

The second AP 710(2) may, for example, rotate one or more antennas to provide the new coverage area B' and/or may switch in or out various antennas (e.g., fixed antennas). For example, an antenna specifically dedicated to providing the coverage area B' may be selected and coupled to either of the first AP 710(1) or second AP 710(2) when desired.

Though the example presented above was presented generally in the context of an operating AP compensating for an AP that became non-operating, note that an AP may also operate as a back-up, for example not operating and/or not operating in a coverage area until a need arises.

In another example scenario, the second AP 710(2) may swing its coverage area B up to B' to assist with an overloading condition of the first AP 710(1) in coverage area A. For example, the second AP 710(2) may modify the extent of the A+B overlap in coverage areas (e.g., anywhere between 0% to 100%) to assist the first AP 710(1) when needed and/or when able. Such assistive behavior may also be flexible. For example, in a first scenario in which the first AP 710(1) is busy servicing its own respective mobile AP(s), the first AP 710(1) might refrain from assisting the second AP 710(2), while in a second scenario in which the first AP 710(1) is not servicing any other nodes (e.g., mobile APs, fixed APs, etc.) or may still adequately service its existing nodes even with a shifted coverages, the first AP 710(1) might adjust its coverage area to overlap with that of the second AP 710(2) to provide assistance. The determination to operate in such a manner may be based on any of a variety of criteria (e.g., latency experienced by mobile APs or user clients thereof, number of nodes being serviced by the AP(s), present bandwidth utilization and/or available bandwidth, channel load, power supply conditions, anticipated bandwidth utilization, priority of particular mobile APs being serviced, the locations of the nodes being served, etc.).

As discussed herein, the decision to adapt AP operation may be made by the AP autonomously, in conjunction with one or more other APs sharing information (e.g., loading information, bandwidth information, latency information, an AP indicating need of assistance, etc.), by a central controller with vision into the overall resource utilization and/or performance of each AP, etc.

Though the example shown in FIG. 7 generally included two APs, any number of APs (or other nodes) may participate in such operation. Additionally, though the example shown in FIG. 7 involved two APs located generally at the same geographical location, the same principles may be applied to two APs located at different geographical locations, for example with overlapping coverage areas, with coverage areas that are capable of overlapping, and also with coverage areas that do not overlap.

Additionally, note that the adaptive operation may also include switching channels, adding a channel to multi-channel operation, etc. For example, in a scenario in which an AP adapts a coverage area to compensate for a failed AP, such AP may also adapt channel utilization, for example operating on a same channel as the failed AP, at least temporarily. Broadcasting a message to other nodes indicating that they need to move to a new channel, etc.

As discussed herein, a node (e.g., a fixed AP, etc.) may adapt antenna pointing direction and/or orientation.

Figure 8:
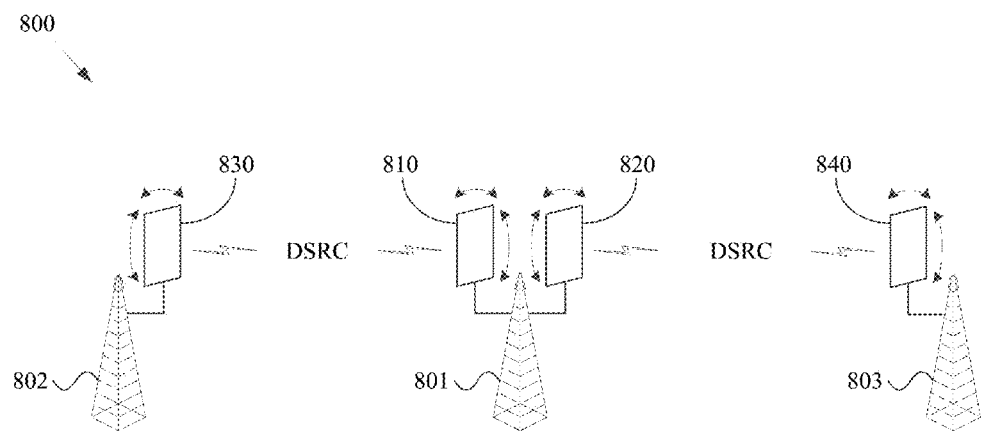
FIG. 8 shows a diagram of a system and method at network nodes for adapting antenna coverage, in accordance with various aspects of the present disclosure.

FIG. 8 shows a diagram of a system and method at network nodes for adapting antenna coverage, in accordance with various aspects of the present disclosure. The example system 800 may, for example, share any or all characteristics with the other example methods, networks, and/or network components 100-700 and 900-1300, discussed herein. For example, the node(s) 801, 802, and 803 may share any or all characteristics with any fixed AP nodes discussed herein.

In an example operating scenario, each node may broadcast its availability. When a mobile AP is within the communication range of a fixed AP, they may exchange information announcing their own availability (e.g., by beaconing, etc.). The mobile AP may, for example, comprise a network manager which determines the best available fixed AP with which to connect, for example taking into the account the signal strength. The signal strength may, for example, drop with the increasing distance between the nodes, and the signal strength may also be significantly influenced by the Line-of-Sight (LoS) and Non-Line-of-Sight (NLoS) conditions between the nodes, conditions that may change substantially as a mobile AP travels.

In accordance with various aspects of this disclosure, by utilizing adaptive antenna positioning (or beamforming technology, etc.), when the fixed AP senses that there is a mobile AP connected to it, the fixed AP may automatically tune its antenna for the direction from which it received the highest signal strength from the mobile AP (e.g., increasing the probability of LoS communication). Such operation may, for example, generally enhance the quality of the communication link between the mobile AP and the fixed AP.

In a scenario in which there is more than one node, the fixed AP may aim an antenna (e.g., mechanically, electrically, etc.) to the best position to serve all the nodes. This position may be determined in any of a variety of manners. For example, the antenna may be aimed at a highest priority mobile AP (e.g., a mobile AP associated with a most expensive service plan, a mobile AP associated with highest priority data, a mobile AP in need of the most communication bandwidth (e.g., actual or anticipated need), a mobile AP at the greatest distance from the fixed AP, a mobile AP with the most connected users, a mobile AP with a historically highest traffic load, a mobile AP with lowest available power supply, etc.). Also for example, the antenna may be aimed to maximize a mean signal strength or RSSI, maximize a mean signal-to-noise ratio (S/N), minimize overall energy consumption and/or overall transmit power, maximize a mean signal quality, etc.

Note that information of signal strength, communication quality, etc., may be measured by the fixed AP, but may also be determined based on information of measurements taken by the mobile APs (or other fixed APs, etc.) serviced by the fixed AP. Also for example, information of bandwidth needs (e.g., actual or anticipated), number of users, data priority, location (e.g., GPS coordinates, etc.), trajectory, anticipated travel path, historical traffic load information, etc., may be communicated to the fixed AP by each of the mobile APs with which the fixed AP is communicating (e.g., in beacon messages, in link control messages, etc.). In addition, the mobile APs may also communicate such information for all of its neighbors. Also note that a fixed AP may also communicate any or all of such information to the mobile AP(s) with which it is communicating.

Based on the information determined by the fixed AP(s) (e.g., determined directly, received from mobile APs, received from other fixed APs, received from a central controller, etc.), the fixed AP(s) can tune/rotate the antenna to achieve the goal (e.g., most throughput, guaranteed throughput for high priority information, lowest power consumption, greatest geographical coverage area, most mobile APs and/or end user clients served, lowest overall cost when considering cellular offload costs, best service for high-priority data, etc.).

In an example scenario, each fixed AP can evaluate the number of vehicles (e.g., autonomous vehicles, taxis, buses, delivery trucks, vans, trains, etc.) and connections that it has nearby, and determine the best orientation of its antenna to maximize the mean RSSI with all of such connections; then, the fixed AP can perform the antenna (or AP) orientation. Note that the fixed AP may transmit information of the current AP and/or antenna orientation (or range of orientations) to other nodes (e.g., to other fixed APs, to mobile APs, to a central controller, etc.).

The mobile APs may also have the ability to tune or direct their antenna(s) to the fixed AP, for example when only one fixed AP is broadcasting. For example, in an example scenario, the fixed AP may receive a first beacon from the mobile AP. Such beacon may, for example, comprise information of the mobile AP's location. The fixed AP may then automatically rotate and/or rotates its antenna to a direction of the mobile AP's location. The fixed AP may then, for example, adjust the direction using RSSI information (e.g., to maximize the RSSI) to get the best signal. The fixed AP may, for example, determine adjustments based on measurements taken throughout a position range interval (e.g., a 1D range, a 2D range, etc.), and select the orientation (e.g., AP and/or antenna orientation, etc.) based on the orientation with the best RSSI from the mobile AP. Such antenna positioning may, for example, be continual.

Note that although various examples presented herein present antenna directing in terms of physically moving the antenna, beam-forming technology and other signal processing technologies may also be utilized.

In FIG. 8, a scenario is shown in which a plurality of nodes (e.g., fixed APs, etc.) are shown. Note that any or all of such nodes may also comprise a mobile AP. In the example shown, a first AP 801 comprising a first antenna 810 that is aimed at a second AP 802 and a second antenna 820 that is aimed at a third AP 803. The first antenna 810 and the second antenna 820 are each movable (or rotatable) in at least two axes, for example a yaw and a pitch axis. Note that in various implementations, a roll axis may also be included. The first AP 801 (e.g., a fixed AP, etc.) has automatically oriented its first antenna 810 to maximize the RSSI of DSRC signals communicated between the first AP 801 and the second AP 802 (e.g., a mobile AP, fixed AP, etc.). Similarly, the second AP 802 has automatically oriented its antenna 830 to maximize the RSSI of DSRC signals communicated between the second AP 802 and the first AP 801. Also, the first AP 801 (e.g., a fixed AP, etc.) has automatically oriented its second antenna 820 to maximize the RSSI of DSRC signals communicated between the first AP 801 and the third AP 803 (e.g., a mobile AP, etc.). Similarly, the third AP 803 has automatically oriented its antenna 840 to maximize the RSSI of DSRC signals communicated between the third AP 803 and the first AP 801.

As discussed herein, an antenna and/or AP may be dynamically moved or re-oriented in response to any of a variety of conditions and/or to achieve any of a variety of communication network goals. Another example of such positional control is provided at FIG. 9.

Figure 9:
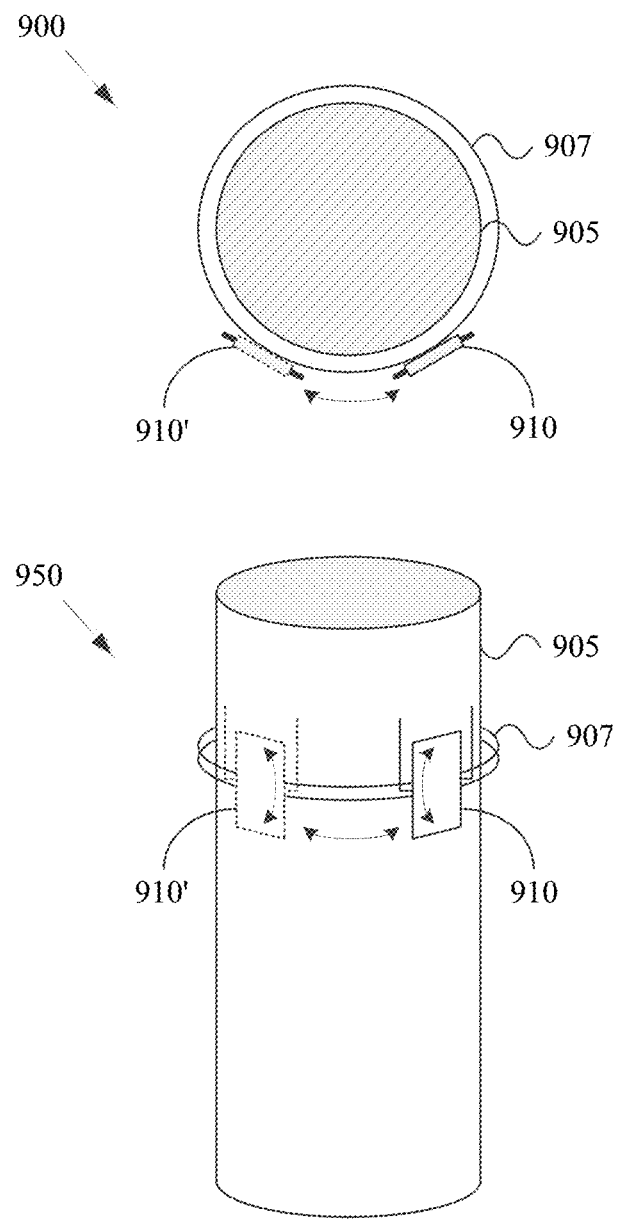
FIG. 9 shows a block diagram of a system and method at a network node for adapting communication coverage, in accordance with various aspects of the present disclosure.

FIG. 9 shows a block diagram of a system and method at a network node for adapting communication coverage, in accordance with various aspects of the present disclosure. The example system 900 may, for example, share any or all characteristics with the other example methods, networks, and/or network components 100-800 and 1000-1300 discussed herein. For example, the node 910 may share any or all characteristics with any fixed AP node discussed herein. Though this example is generally presented in the context of a fixed AP with adaptable position, it should be understood that this example also applies to dynamic antenna positioning as discussed herein.

In addition to, or instead of, the fixed APs comprising moveable (and/or tunable) antennas, the fixed APs may also be moveable. Such movement capability may, for example, be utilized in a scenario in which an antenna to be moved is rigidly attached to the AP. For example, moving the AP also moves the antenna(s) and thus adjusts the directionality of the antenna and/or coverage area. Also, the structure on which the AP is mounted (e.g., a tower, pole, wall, etc.) may interfere with signals in particular directions, and thus the AP may be moved around such structure.

The AP may be moved in a similar manner to the antennas discussed herein. Also, the AP may be moved for the same reasons as the antennas discussed herein and/or to achieve the same goals.

The flexibility provided by a system and method implemented in accordance with various aspects of this disclosure provides for dynamic infrastructure configuration. For example, the entire AP infrastructure (or any portion thereof) may be adapted for events (e.g., sporting events, parades, sunny days, emergency situations, etc.) and/or test configurations may be conveniently implemented and utilized. For example, the wireless infrastructure may be adapted without dispatching technicians to the sites of fixed APs to make adjustments.

In FIG. 9, label 900 denotes a top view, and label 950 denotes a perspective view. In the example illustration, an AP 910 (e.g., a fixed AP with some movement capability) is attached to a pole 905 via a rail system 907. Though not shown, the AP 910 may be controllably moved along the rail system 907 with an actuator (e.g., a motor, etc.), such that the AP 910 has 360 degrees of freedom around the pole 905. The illustration shows the AP 910 moving to a position 910'. As shown, the AP 910 may also be coupled to a fixture that provides for upward/downward rotation (e.g., a pitch rotation), and may also be coupled to a fixture that provides for a roll rotation that may for example change antenna polarization.

As discussed herein, a node (e.g., a fixed AP, etc.) may be adaptively powered. Such adaptability may provide any of a variety of benefits. For example, an AP may be installed at a location that does not have access to a traditional power source (e.g., the electrical power grid of a municipality or building, etc.). Also for example, such adaptability may provide for fail-safe operation when a primary power source fails. An example of a node (e.g., a fixed AP) with adaptable power supply characteristics is shown at FIG. 10.

Figure 10:
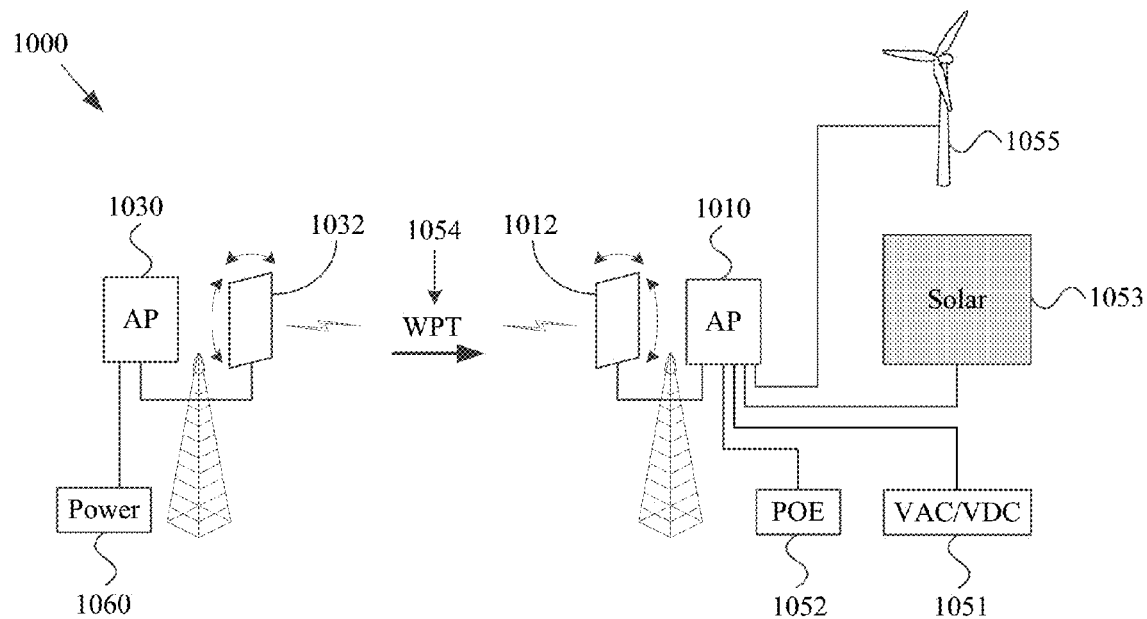
FIG. 10 shows a block diagram of a system and method at a network node for adapting node power supply, in accordance with various aspects of the present disclosure.

FIG. 10 shows a block diagram of a system and method at a network node for adapting node power supply, in accordance with various aspects of the present disclosure. The example system 1000 may, for example, share any or all characteristics with the other example methods, networks, and/or network components 100-900 and 1100-1300, discussed herein. For example, the nodes 910 and/or 1030 may share any or all characteristics with any fixed AP nodes discussed herein.

The example fixed AP 1010 may receive electrical power from any of a variety of different sources. For example, the fixed AP 1010 may receive electric power from a utility power grid 1051 (e.g., 5-80 VDC, 100-240 VAC, etc.). Also for example, the fixed AP 1010 may receive electrical power from a Power-Over-Ethernet source 1052. The fixed AP 1010 may, for example, receive electrical power from a solar power source 1053 and/or a wind power source 1055. Also for example, the fixed AP 1010 may receive power from a battery. Additionally for example, the fixed AP 1010 may receive electrical power via wireless power transfer (WPT), for example using a signal 1054 (e.g., DSRC signal, WiMAX signal, etc.) (or near such band) transmitted directly to the fixed AP 1010 by another node 1030 (e.g., a second AP 1030) via an antenna 1032. Such other AP 1030 may for example also receive electrical power from any of a variety of sources 1060.

The example AP 1010 may, for example, select one or more of a plurality of power sources from which to receive electrical power. Such selection may be based on one or more of any of a variety of criteria. For example, the AP 1010 may have a prioritized list of power sources to utilize when available. For example, the AP 1010 may operate to draw as much power as it can from the highest priority and available power source, and then draw remaining power if needed from a next highest priority source if available, and so on. The AP 1010 may, for example, comprise a battery from which the AP 1010 only draws power as a last resort (e.g., otherwise maintaining the battery in a fully charged state).

As power needs of the AP 1010 change and/or as power supply availability change, the AP 1010 may adaptively draw power from the best source or combination of sources.

As discussed herein, in addition to the AP and/or antenna adaptability, and power source adaptability, various aspects of this disclosure may also provide for adapting the transmission power of a node (e.g., of a fixed AP, etc.).

Figure 11:
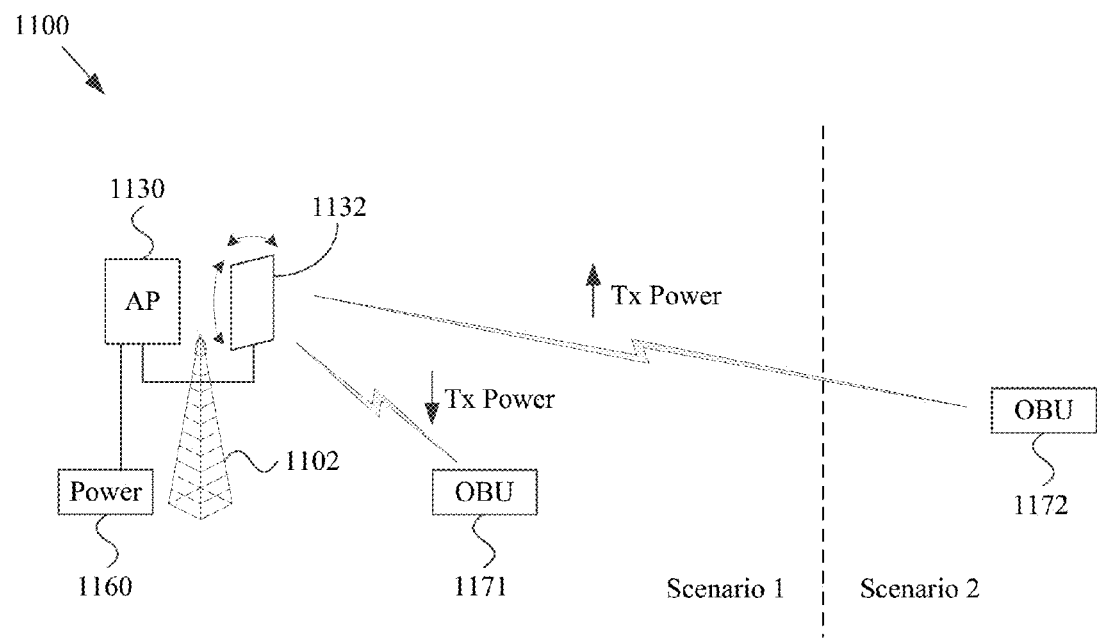
FIG. 11 shows a block diagram of a system and method at a network node for adapting transmission power, in accordance with various aspects of the present disclosure.

FIG. 11 shows a block diagram of a system and method at a network node for adapting transmission power, in accordance with various aspects of the present disclosure. The example system 1100 may, for example, share any or all characteristics with the other example methods, networks, and/or network components 100-1000 and 1200-1300, discussed herein. For example, the node 1130 may share any or all characteristics with any fixed AP nodes discussed herein, and the nodes 1171 and/or 1172 may share any or all characteristics with any mobile AP nodes discussed herein.

The example system 1100 comprises a fixed AP 1130 node, which may for example be movable, and a moveable antenna 1132 as discussed herein. In general, various aspects of the present disclosure provide for increasing transmit power between the fixed AP 1130 and a node (e.g., the mobile AP 1172) when such nodes are relatively far from each other, and for decreasing the transmit power between the fixed AP 1130 and a node (e.g., the mobile AP 1171) when such nodes are relatively close to each other.

In accordance with various aspects of the present disclosure, flexibility is also incorporated to increase and/or decrease effective transmission power by adjusting the antenna and/or AP. For example, to reduce noise caused by the mobile AP 1172 and/or power consumption, the AP 1130 may direct the antenna 1132 toward the mobile AP 1172 (and thus provide the maximum antenna gain to the mobile AP 1172). Such antenna movement may include, for example, changing a compass direction (i.e., direction in a horizontal plane) of the radio frequency signals transmitted from and/or the alignment of the antenna to coincide with the location of the source of signals received by the antenna 1132. In addition, antenna movement may include, for example, the up/down adjustment of the pitch or tilt of the antenna 1132 (e.g., sometimes referred to as "downtilt") to more accurately and effectively transmit signals to/receive signals from mobile APs based on their distance from the fixed AP (e.g., fixed AP 1130). In addition, such adjustments to the direction of the signals transmitted by, and sensitivity to signals arriving at the antenna 1132 may be performed using electronic beamforming techniques (e.g., using phased arrays). In such a scenario, the fixed AP 1130 and the mobile AP 1172 may communicate effectively utilizing lower power at the transmitter that would normally be utilized. Also, in such a scenario, since the mobile AP 1171 is relatively close to the fixed AP 1130, any increase in transmission power necessary for effective communication between such nodes due to the aiming of the antenna 1132 toward the mobile AP 1172 will be relatively small.

In an example scenario in which the mobile AP 1171 is the only mobile AP in communication with the fixed AP 1130, or for example is the highest priority mobile AP, the fixed AP 1130 may direct the antenna 1132 to (or toward) the mobile AP 1171 and thus provide for a substantial reduction in the transmitter power utilized by the fixed AP 1130 and/or the mobile AP 1171. For example, the fixed AP 1130 may position the antenna 1132 (and/or the AP 1130 itself) such that the mobile AP 1171 is in the direction of maximum gain for the antenna 1132. By providing for a reduction in transmission power, for example as transmitted by the mobile AP 1171, various aspects of this disclosure also provide for a reduction in noise related to such transmission.

In accordance with various aspects of the present disclosure, the OBU 1171 and the OBU 1172 may be equipped with geolocation functionality such as, for example, a global navigation satellite system (GNSS)(e.g., Global Positioning System (GPS)) receiver (not shown), enabling the OBU 1171 and OBU 1172 to know their respective geographic location (e.g., latitude and longitude). Such geographic location information may be shared with other nodes of a network of moving things as described herein, in particular, with one or more fixed APs such as, for example, fixed AP 1130. The fixed AP 1130, in accordance with aspects of the present disclosure, may know its own geographic location (e.g., via a GNSS/GPS receiver connected to the fixed AP or as determined by a survey), and may then use its own geographic location and the geographic location of an OBU such as the OBU 1171 or the OBU 1172 to enable it to appropriately position the antenna 1132 to more effectively communicate with the OBU 1171 and/or OBU 1172 (e.g., communicate at a lower transmitted signal power, lower bit error rate, higher signal-to-noise ratio, higher data rate, etc.)

In accordance with some aspects of the present disclosure, an OBU such as the OBU 1171 or OBU 1172 may be installed in a particular vehicle having a particular important, urgent, or critical need for communication via a network of moving things as described herein (e.g., vehicles of first responders such as fire vehicles, police vehicles, and ambulance service vehicles, autonomous vehicles, etc.). In anticipation of and/or during travel within the coverage area of a network according to the present disclosure, systems of the particular vehicle or the operating organization (e.g., personnel, computer system(s)) may share the planned route of such a vehicle with the elements/nodes of the network of moving things (e.g., with a Cloud-based system that is in communication with the fixed and mobile APs of the network of moving things). In preparation to communicate with the OBU of the particular vehicle, the fixed AP(s) (e.g., fixed AP 1130) may then autonomously position their respective antenna(s) (e.g., antenna 1132), or the fixed AP(s) may be directed by, for example, other network elements/nodes (e.g., a Cloud-based system, MC) to position their respective antenna(s)) to provide coverage areas that more effectively communicate with the OBU of the particular vehicle, in anticipation of the movement of the particular vehicle into the coverage areas of the positioned antenna(s) of the fixed AP(s).

As discussed herein, in addition to the AP and/or antenna adaptability, power source adaptability, and/or transmission power adaptability, various aspects of this disclosure may also provide for adapting the backbone communication of a node (e.g., of a fixed AP, etc.).

Figure 12:
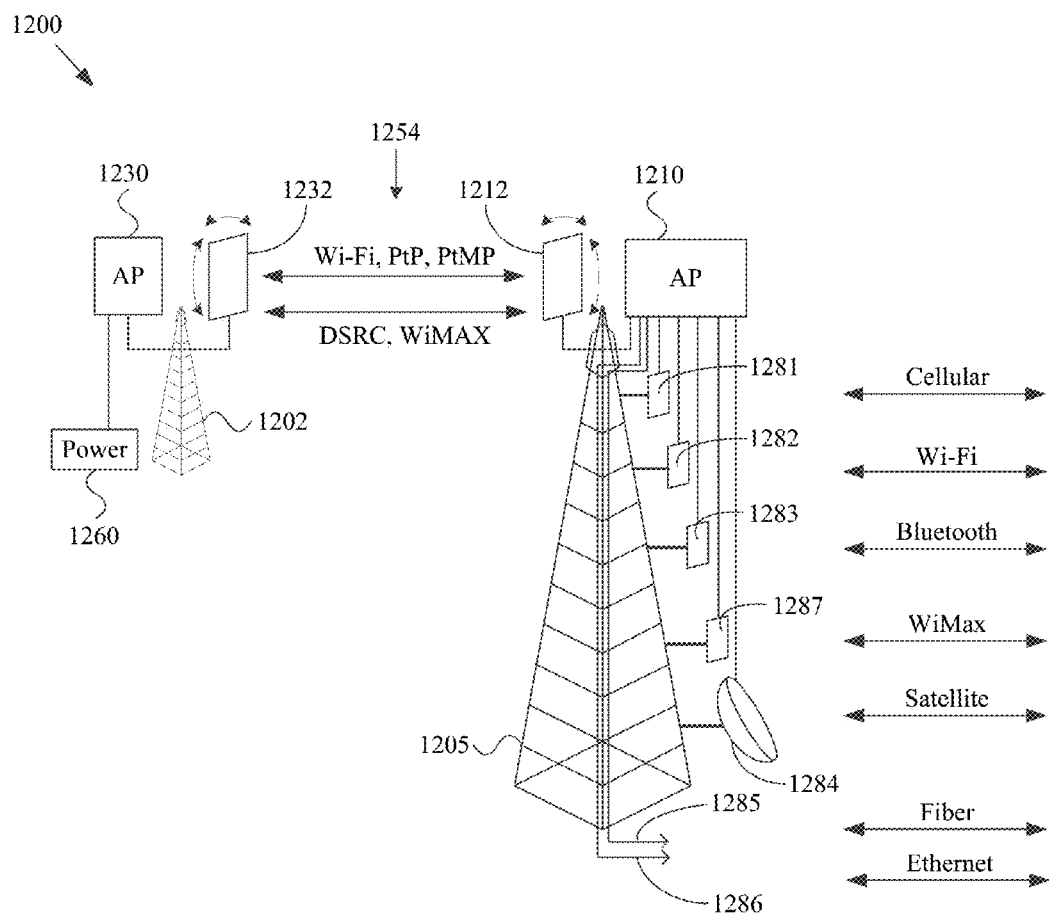
FIG. 12 shows a block diagram of a system and method in a network node for adaptive backhaul communication, in accordance with various aspects of the present disclosure.

FIG. 12 shows a block diagram of a system and method in a network node for adaptive backhaul communication, in accordance with various aspects of the present disclosure. The example system 1200 may, for example, share any or all characteristics with the other example methods, networks, and/or network components 100-1100 and 1300, discussed herein. For example, the nodes 1210 and/or 1230 may share any or all characteristics with any fixed AP nodes discussed herein.

The example fixed AP 1210 (or other node) is communicatively coupled to a plurality of communication backbones. For example, the fixed AP 1210 is communicatively coupled to a cellular antenna 1281 for cellular backbone communication, a Wi-Fi antenna 1282 for Wi-Fi (or WLAN) backbone communication, a Bluetooth antenna 1283 for Bluetooth (or WPAN) backbone communication, a satellite antenna 1284 for satellite network communication, a fiber port 1285 for fiber network communication, an Ethernet port 1286 for Ethernet network communication, a WiMAX antenna for WiMAX (or WMAN) antenna communication, one or more IEEE 802.11p antennas 1212 that may be utilized for DSRC backbone communication, for dedicated Wi-Fi Point-to-Point (PtP) links or Point-to-Multipoint (PtMP) links for backbone communication, etc. Note that the fixed AP 1210 may comprise one or multiple ports for a particular backbone communication technology. For example, the fixed AP 1210 may have multiple Ethernet ports for Ethernet network communication over a same or different respective Ethernet networks, multiple cellular ports for cellular communication over a same or different respective cellular networks, etc. Such redundancy may, for example, be utilized for enhanced communication, failover communication, enhanced multi-source power supply, failover power supply, etc. In general, any of the communication modules discussed herein may be duplicated for failover redundancy, for increased bandwidth (e.g., always or only when needed), etc.

In an example implementation, for example including CCTV cameras (or other sensors) that are too far away for standard Wi-Fi, DSRC, or WiMAX and for which installing fiber is too expensive, a dedicated PtP Wi-Fi link (e.g., capable of PtMP operation) may be utilized to create a Wi-Fi backhaul for the CCTV cameras, and the same backhaul may be shared with a fixed AP.

In another example implementation, for example in which it is desired to install a new AP in a place in which data communication capability is low and for which there is no access to fiber (e.g., physically impossible, economically infeasible, etc.), the AP may be installed (e.g., on a wall, building, pole, etc.) in-range of a Wi-Fi access point, and standard Wi-Fi may be utilized as a backhaul.

In still another example implementation, for example in which it is desired to install several fixed APs along a road with no fiber or hard-wired infrastructure, a dedicated PtMP Wi-Fi link may be utilized. For example, each post (e.g., light pole, traffic light post, etc.) may for example comprise a single Wi-Fi AP and several Wi-Fi Stations, which operate to provide a backhaul for the fixed APs.

In yet another example implementation, DSRC may be utilized as a backhaul. For example, a fixed AP may utilize a DSRC link to another fixed AP that is already connected to the network (e.g., hardwired, fiber-connected, microwave-linked, etc.). A single fixed AP may, for example, provide backhaul service to several other fixed APs. As discussed herein, a fixed AP may adaptively be switched into and out of such a backhaul role.

Note that any of a variety of communication technologies (e.g., cellular communication, satellite communication, etc.) may also be utilized as a backup to a failure in the usual or default backhaul.

It should also be noted that, in accordance with various aspects of the present disclosure, one, two or more of the approaches discussed above may be employed by an access point (e.g., a fixed AP or mobile AP), according to, by way of example and not limitation, the way in which the network nodes are deployed over the service area, the number and/or density of the vehicles (e.g., OBUs/MAPs) in the area being served, the number of end-users in the area being served; and the mean speed of the vehicles in the area being served. Other factors may also be taken into account including, by way of example and not limitation, the particular mix of data communication activities currently active in the area being served (e.g., types of data (e.g., continuous stream, bursty, periodic, delay-tolerant, time-sensitive, high-priority/health and safety/law enforcement related)), the bit rate(s), the aggregate volume of data being transported, the quality of service (QoS) and/or quality of experience (QoE) agreed upon in any applicable service level agreement(s) (SLA), etc.). Additional factors may also be taken into consideration in selecting which of the above-identified approaches are used including, by way of example and not limitation, a level of each of various resources that may be required such as, for example, computing resources (e.g., processor load, memory capacity/occupancy, communication interface capacity, wireless link capacity, link latencies), and energy resources (e.g., the total amount of electrical power required to support one or more of the approaches individually or in combination, and/or the amount of mains/battery power available). In accordance with aspects of the present disclosure, network nodes as described herein may be given a set of rules, operating conditions, and/or guidelines as downloaded parameters and/or in the form of executable code that define which approach(es) is/are to be used in a particular deployed network arrangement. Thus, nodes of a network in accordance with the present disclosure may automatically and/or autonomously evaluate the real-time context of the network, and may enable/disable the use of each of the above-identified approaches to improving/optimizing access point coverage.

Figure 13:
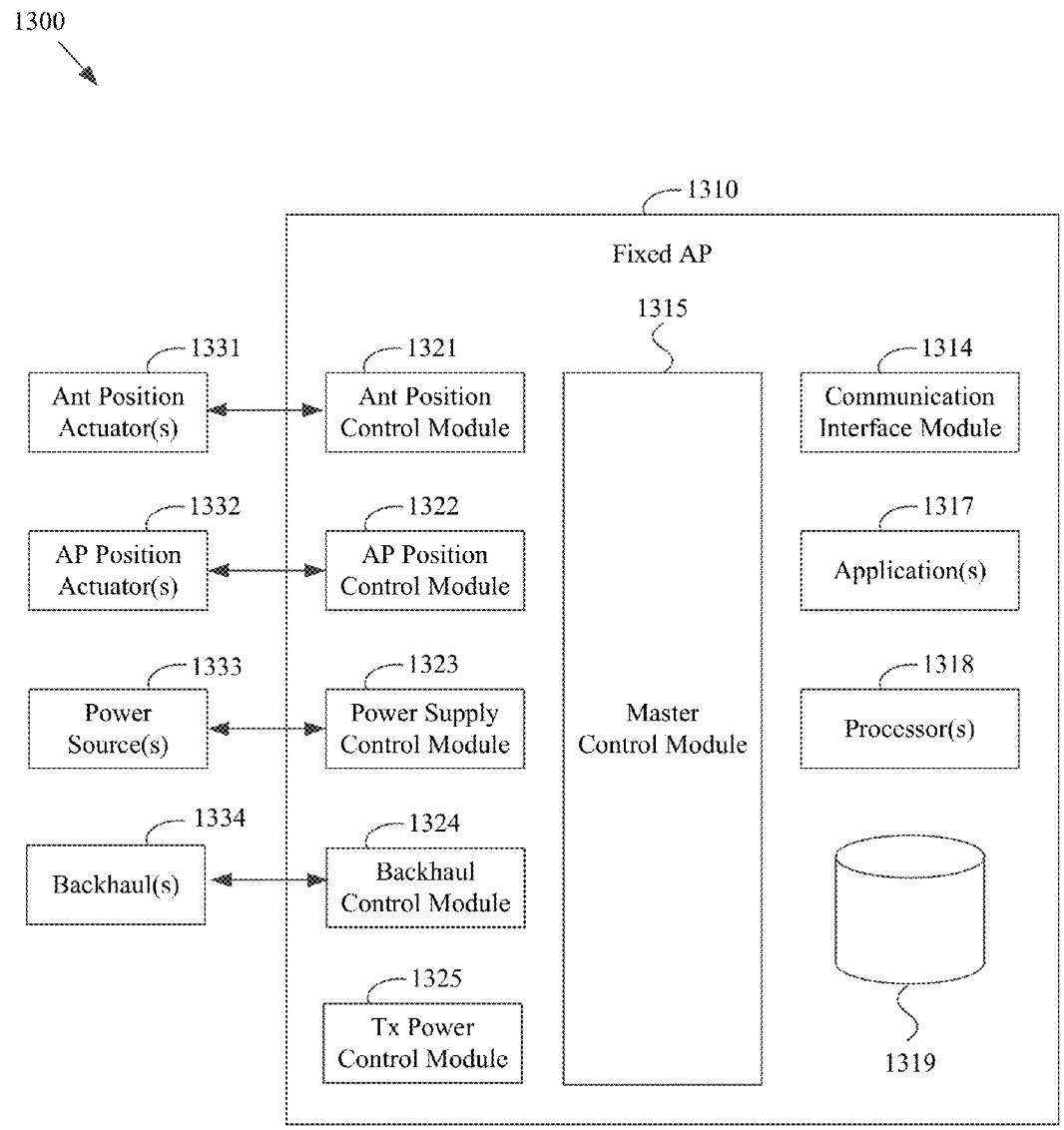
FIG. 13 shows a block diagram of various components of an example network node, in accordance with various aspects of the present disclosure.

FIG. 13 shows a block diagram of various components of an example network node, in accordance with various aspects of the present disclosure. The example node 1300 may, for example, share any or all characteristics with the other example methods, nodes, networks, and/or network components 100-1200, discussed herein. For example, any or all of the components of the example node 1300 may perform any or all of the method steps presented herein.

The example node 1300 comprises a fixed AP 1310. The fixed AP 1310 comprises a variety of modules, non-limiting examples of which are provided herein.

The fixed AP 1310 comprises a communication interface (I/F) module 1314 that operates to perform any or all of the wireless and/or wired communication functionality for the fixed AP 1310, many examples of which are provided herein (e.g., communication with mobile APs, communication with peer fixed AP nodes, communication with network infrastructure, communication directly with client devices, backhaul communication, reception of global navigation satellite signals (GNSS), etc.). The communication I/F module 1314 may, for example, operate in accordance with any of a variety of cellular communication protocols, wireless LAN communication protocols (e.g., Wi-Fi, etc.), wireless PAN communication protocols (e.g., Bluetooth, etc.), IEEE 802.11p or DSRC, satellite communication protocols, fiber or cable communication protocols, LAN protocols (e.g., Ethernet, etc.), etc. For example, any of the example communication discussed herein between a fixed AP and another node may be performed utilizing the Communication I/F Module 1314.

The example node 1300 also comprises one or more antenna position actuators 1331, and the fixed AP 1310 comprises an antenna position control module 1321 that controls the antenna position actuators 1331. The antenna position control module 1321 may, for example, operate to control any or all of the antenna positioning (or orienting) functionality discussed herein, for example with regard to FIGS. 7 and 8, generally FIGS. 7-12, etc. The antenna position control module 1321 may, for example, send positioning commands to the antenna position actuators(s) 1331 to move an antenna to a particular position, to a difference in position, etc. The antenna position control module 1321 may also, for example, receive and process feedback from the antenna position actuators(s) 1331 regarding the state or position of an antenna. The antenna position control module 1321 may, for example, operate to perform any or all of the antenna position determination functionality discussed herein. In an example implementation, the antenna position actuator(s) 1331 may include motor drive circuitry, but some or all of such motor drive circuitry may also be part of the antenna position control module 1321. The antenna position control module 1321 may communicate with the antenna position actuators 1331 via any of a variety of communication interfaces (e.g., dedicated wire, USB, Ethernet, etc.).

The example node 1300 also comprises one or more AP position actuators 1332, and the fixed AP 1310 comprises an AP position control module 1332 that controls the AP position actuators 1332. The AP position control module 1322 may, for example, operate to control any or all of the AP positioning (or orienting) functionality discussed herein, for example with regard to FIG. 9, generally FIGS. 7-12, etc. The AP position control module 1322 may, for example, send positioning commands to the AP position actuators(s) 1332 to move an AP to a particular position, to a difference in position, etc. The AP position control module 1322 may also, for example, receive and process feedback from the AP position actuators(s) 1332 regarding the state or position of an AP. The AP control module 1322 may, for example, operate to perform any or all of the AP position determination functionality discussed herein. In an example implementation, the AP Position Actuator(s) 1332 may include motor drive circuitry, but some or all of such motor drive circuitry may also be part of the AP position control module 1322. The AP position control module 1322 may communicate with the AP position actuators 1332 via any of a variety of communication interfaces (e.g., dedicated wire, USB, Ethernet, etc.).

The example node 1300 also comprises one or more power sources 1333, and the fixed AP 1310 comprises a power supply control module 1323 that controls the power sources 1333. The power supply control module 1323 may, for example, operate to control any or all of the power supply functionality discussed herein, for example with regard to FIG. 10, generally FIGS. 7-12, etc. The power supply control module 1323 may, for example, send power supply control commands to the power sources 1333 to select power source(s), turn on/off particular power sources, to control an amount of power received from a particular power source, to monitor power source state, etc. The power supply control module 1323 may also, for example, receive and process feedback from the power source(s) 1333 regarding the state or position of the power source(s) 1333. The power supply control module 1323 may, for example, operate to perform any or all of the power supply determination functionality discussed herein (e.g., determine which power supplies to utilize, determine how to utilize each power supply, etc.). In an example implementation, the power source(s) 1333 may include electric power control circuitry, but some or all of such electric power control circuitry may also be part of the power supply control module 1323. The power supply control module 1323 may communicate with the power source(s) 1333 via any of a variety of communication interfaces (e.g., dedicated wire, USB, Ethernet, etc.).

The example node 1300 also comprises one or more backhauls 1334, and the fixed AP 1310 comprises a backhaul control module 1324 that controls the backhauls 1334. The backhaul control module 1324 may, for example, operate to control any or all of the backhaul control functionality discussed herein, for example with regard to FIG. 12, generally FIGS. 7-12, etc. The backhaul control module 1424 may, for example, send backhaul control commands to the backhaul(s) 1434 to select backhaul(s), turn on/off particular backhaul(s), to control an amount of utilization of a particular backhaul, to monitor backhaul state, etc. The backhaul control module 1324 may also, for example, receive and process feedback from the backhaul(s) 1334 regarding the state or position of the backhaul(s) 1334. The backhaul control module 1324 may, for example, operate to perform any or all of the backhaul determination functionality discussed herein (e.g., determine which backhaul(s) to utilize, determine how to utilize each backhaul, etc.). In an example implementation, the backhaul(s) 1334 may include backhaul control circuitry, but some or all of such backhaul control circuitry may also be part of the backhaul control module 1324. The backhaul control module 1324 may communicate with the backhaul(s) 1334 via any of a variety of communication interfaces (e.g., over the backhaul itself, to a backhaul access provider server, etc.).

The example AP 1310 also comprises a transmission power control module 1325. The transmission power control module 1325 may, for example, operate to control any or all of the transmission power control functionality discussed herein, for example with regard to FIG. 11, generally FIGS. 7-12, etc. The transmission power control module 1325 may, for example, send transmission power control commands to the communication interface module 1314 to specify transmission power adjustments, conduct transmission power testing, etc. The transmission power control module 1325 may also, for example, receive and process feedback from the communication interface module 1314 (or from other nodes via the communication interface module 1314) regarding signal quality, RSSI, S/N ratio, etc. The transmission power control module 1325 may, for example, operate to perform any or all of the transmission power control functionality discussed herein (e.g., determine the node or nodes on which to base transmission power, determine whether and/or how to arbitrate transmission power with regard to multiple nodes, determine when an antenna and/or AP position adjustment is made that may warrant a redetermination of transmission power or strategy, etc.).

The example AP 1310 also comprises a master control module 1315. The master control module 1315 may, for example, operate to monitor and/or command each of the other modules of the AP 1310 (e.g., the antenna position control module 1321, the AP position control module 1322, the power supply control module 1323, the backhaul control module 1324, the transmission power control module 1325, the communication interface module 1314, etc. For example, the master control module 1315 may determine the overall operation strategy or adaptive strategy for the fixed AP 1310 and then command the other modules to implement the strategy.

The example fixed AP 1310 may also comprise one or more applications 1317. Such applications may, for example, request, utilize, and/or provide information regarding the adaptive operation of the fixed AP 1310. Such applications 1317 may, for example, monitor operation of the fixed AP 1310 and communicate information of such monitoring with other applications of other nodes. Such applications 1317 may, for example, comprise applications that are wholly unrelated to adaptive operation of the fixed AP 1310 (e.g., general communication control applications, sensor interface applications, etc.).

The example fixed AP 1310 may also comprise one or more processors 1318 and memory devices 1319. The processor(s) 1318 may, for example, comprise any of a variety of processor characteristics. For example, the processor(s) 1318 may comprise one or more of a general purposes processor, a RISC processor, a microcontroller, an ASIC, a DSP, a video processor, etc.). The memory device(s) 1319 may, for example comprise any of a variety of memory characteristics. For example, the memory device(s) 1319 may comprise a volatile memory, non-volatile memory, etc. The memory device(s) 1319 may, for example, comprise a non-transitory computer-readable medium that comprises software instructions that when executed by the processor(s) 1318, cause the fixed AP 1310 to perform any or all of the functionality discussed herein (e.g., with regard to the example methods discussed herein, etc.).

Aspects of the present disclosure may be seen in a system providing improved wireless communication with one or more mobile network nodes of a plurality of network nodes, over an area of coverage of a wireless access point node at a fixed location of a network of moving things. Such a system may comprise one or more communication interfaces configured to communicate with the one or more mobile network nodes using corresponding radio frequency signals, and one or more antenna control interfaces configured to adjust a direction of reception and transmission of the corresponding radio frequency signals by corresponding radio frequency antennas. The system may also comprise a transmit power controller configured to adjust power of transmission of the corresponding radio frequency signals, and to receive and process feedback from, the one or more communication interfaces; and one or more processors operably coupled to the one or more communication interfaces, the one or more antenna control interfaces, and the transmit power controller. The one or more processors may be operable to, at least, communicate with a particular mobile network node of the one or more mobile network nodes using corresponding radio frequency signals and corresponding radio frequency antennas at a corresponding transmission power and a corresponding direction of reception and transmission, and adjust the direction of reception and transmission of the corresponding radio frequency signals by the corresponding radio frequency antennas. The one or more processors may also be operable to, at least, adjust the transmission power of the corresponding radio frequency signals based upon the adjustment to the corresponding direction of reception and transmission, and communicatively couple the particular mobile network node to a backhaul communication link.

In accordance with various aspects of the present disclosure, adjusting a direction of reception and transmission of corresponding radio frequency signals by a corresponding antenna may comprise controlling respective actuators to produce respective physical motions of the corresponding radio frequency antenna. Adjusting transmission power may comprise determining which network node of the plurality of network nodes on which to base transmission power, and adjusting transmission power may comprise determining whether to arbitrate transmission power with regard to multiple network nodes of the plurality of network nodes. Adjusting transmission power may also comprise determining whether to adjust transmission power based on an adjustment to the direction of reception and transmission of the corresponding radio frequency signals by the corresponding radio frequency antenna. The one or more processors may be operable to, at least, adjust the direction of reception and transmission of radio frequency signals based upon respective geographic locations received from the one or more mobile network nodes. The backhaul communication link may comprise one of a wireless cellular data link, a wireless local area network, and a wired data network, and the backhaul communication link may be selected by the one or more processors from two or more available communication links according to configuration information received from a Cloud-based system by the one or more processors.

Additional aspects of the present disclosure may be found in a method of operating a system that provides improved wireless communication with one or more mobile network nodes of a plurality of network nodes, over an area of coverage of a wireless access point node at a fixed location of a network of moving things. Such a method may comprise communicating with a particular mobile network node of the one or more mobile network nodes using corresponding radio frequency signals and corresponding radio frequency antennas at a corresponding transmission power and a corresponding direction of reception and transmission, and adjusting the direction of reception and transmission of the corresponding radio frequency signals by the corresponding radio frequency antennas. The method may also comprise adjusting the transmission power of the corresponding radio frequency signals based upon the adjustment to the corresponding direction of reception and transmission; and communicatively coupling the particular mobile network node to a backhaul communication link.

Adjusting a direction of reception and transmission of corresponding radio frequency signals by a corresponding antenna may comprise controlling respective actuators to produce respective physical motions of the corresponding radio frequency antenna. Adjusting transmission power may comprise determining which network node of the plurality of network nodes on which to base transmission power, and adjusting transmission power may comprise determining whether to arbitrate transmission power with regard to multiple network nodes of the plurality of network nodes. Adjusting transmission power may also comprise determining whether to adjust transmission power based on an adjustment to the direction of reception and transmission of the corresponding radio frequency signals by the corresponding radio frequency antenna. Adjusting the direction of reception and transmission of radio frequency signals may comprise adjusting the direction of reception and transmission based upon respective geographic locations received from the one or more mobile network nodes. The backhaul communication link may comprise one of a wireless cellular data link, a wireless local area network, and a wired data network. The backhaul communication link may be selected from two or more available communication links according to configuration information received from a Cloud-based system.

Further aspects of the present disclosure may be observed in a non-transitory computer-readable medium comprising a plurality of code sections, where each code section comprises a plurality of instructions executable by one or more processors. The instructions may cause the one or more processor to perform the steps of a method of operating a system that provides improved wireless communication with one or more mobile network nodes of a plurality of network nodes, over an area of coverage of a wireless access point node at a fixed location of a network of moving things, where the steps of the method are as described above.

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A system providing improved wireless communication with one or more mobile network nodes of a plurality of network nodes of a network of moving things, over one or more areas of coverage of a wireless access point node of the plurality of network nodes, the system comprising:
    one or more communication interfaces configured to communicate with the one or more mobile network nodes using corresponding radio frequency signals;
    one or more antenna control interfaces configured to adjust a direction of reception and transmission of the corresponding radio frequency signals by corresponding radio frequency antennas;
    a transmit power controller configured to adjust power of transmission of the corresponding radio frequency signals, and to receive and process feedback from, the one or more communication interfaces; and
    one or more processors operably coupled to the one or more communication interfaces, the one or more antenna control interfaces, and the transmit power controller, the one or more processors operable to, at least:
        receive information representative of a planned route for a vehicle comprising a particular mobile network node of the plurality of network nodes,
        in preparation to communicate with the particular mobile network node of the vehicle, autonomously adjust the one or more areas of coverage of the wireless access point node to enable wireless communication with the particular mobile network node, using the information representative of the planned route of the vehicle, and
        communicatively couple the particular mobile network node to a backhaul communication link.

2. The system according to claim 1, wherein adjusting the one or more areas of coverage of the wireless access point node comprises adjusting a direction of reception and transmission of one or more antennas.

3. The system according to claim 2, wherein adjusting a direction of reception and transmission of the one or more antennas comprises controlling respective actuators to produce respective physical motions of the corresponding one or more antennas.

4. The system according to claim 1, wherein adjusting the one or more areas of coverage of the wireless access point node comprises adjusting a transmission power of corresponding signals.

5. The system according to claim 1, wherein the planned route for the vehicle is shared by the particular mobile network node with other mobile network nodes.

6. The system according to claim 1, wherein the wireless access point node adjusts the one or more areas of coverage using information representative of the geographic location of the wireless access point node and information representative of a geographic location of the particular mobile network node shared by the particular mobile network node.

7. The system according to claim 1, wherein the vehicle comprises an autonomous vehicle.

8. The system according to claim 7, wherein the information representative of the planned route for the vehicle is provided by a system of the autonomous vehicle.

9. A method of operating a system that provides improved wireless communication with one or more mobile network nodes of a plurality of network nodes of a network of moving things, over one or more areas of coverage of a wireless access point node of the plurality of network nodes, the method comprising:
    receiving information representative of a planned route for a vehicle comprising a particular mobile network node of the plurality of network nodes;

in preparation to communicate with the particular mobile network node of the vehicle, autonomously adjusting the one or more areas of coverage of the wireless access point node to enable wireless communication with the particular mobile network node, using the information representative of the planned route of the vehicle; and communicatively coupling the particular mobile network node to a backhaul communication link.

10. The method according to claim 9, wherein adjusting the one or more areas of coverage of the wireless access point node comprises adjusting a direction of reception and transmission of one or more antennas.

11. The method according to claim 10, wherein adjusting a direction of reception and transmission of the one or more antennas comprises controlling respective actuators to produce respective physical motions of the corresponding one or more antennas.

12. The method according to claim 9, wherein adjusting the one or more areas of coverage of the wireless access point node comprises adjusting a transmission power of corresponding signals.

13. The method according to claim 9, wherein the planned route for the vehicle is shared by the particular mobile network node with other mobile network nodes.

14. The method according to claim 9, wherein the wireless access point node adjusts the one or more areas of coverage using information representative of the geographic location of the wireless access point node and information representative of a geographic location of the particular mobile network node shared by the particular mobile network node.

15. The method according to claim 9, wherein the vehicle comprises an autonomous vehicle.

16. The method according to claim 15, wherein the information representative of the planned route for the vehicle is provided by a system of the autonomous vehicle.

17. A non-transitory computer-readable medium on which a plurality of code sections are stored, each code section comprising a plurality of instructions executable by one or more processors to cause the one or more processors to perform the steps of a method of operating a system that provides improved wireless communication with one or more mobile network nodes of a plurality of network nodes of a network of moving things, over one or more areas of coverage of a wireless access point node of the plurality of network nodes, the steps of the method comprising:

receiving information representative of a planned route for a vehicle comprising a particular mobile network node of the plurality of network nodes;

in preparation to communicate with the particular mobile network node of the vehicle, autonomously adjusting the one or more areas of coverage of the wireless access point node to enable wireless communication with the particular mobile network node, using the information representative of the planned route of the vehicle; and communicatively coupling the particular mobile network node to a backhaul communication link.

18. The non-transitory computer-readable medium according to claim 17, wherein adjusting the one or more areas of coverage of the wireless access point node comprises adjusting a direction of reception and transmission of one or more antennas.

19. The non-transitory computer-readable medium according to claim 18, wherein adjusting a direction of reception and transmission of the one or more antennas comprises controlling respective actuators to produce respective physical motions of the corresponding one or more antennas.

20. The non-transitory computer-readable medium according to claim 17, wherein adjusting the one or more areas of coverage of the wireless access point node comprises adjusting a transmission power of corresponding signals.

21. The non-transitory computer-readable medium according to claim 17, wherein the planned route for the vehicle is shared by the particular mobile network node with other mobile network nodes.

22. The non-transitory computer-readable medium according to claim 17, wherein the wireless access point node adjusts the one or more areas of coverage using information representative of the geographic location of the wireless access point node and information representative of a geographic location of the particular mobile network node shared by the particular mobile network node.

23. The non-transitory computer-readable medium according to claim 17, wherein the vehicle comprises an autonomous vehicle.

24. The non-transitory computer-readable medium according to claim 23, wherein the information representative of the planned route for the vehicle is provided by a system of the autonomous vehicle.

* * * * *